Patented May 4, 1926.

1,582,954

UNITED STATES PATENT OFFICE.

GEORGE D. WHITE, OF PORT ARTHUR, TEXAS, ASSIGNOR TO THE TEXAS COMPANY, OF NEW YORK, N. Y., A CORPORATION OF TEXAS.

JOINING MATERIALS.

No Drawing.      Application filed February 20, 1920. Serial No. 360,154.

*To all whom it may concern:*

Be it known, that I, GEORGE D. WHITE, a citizen of the United States, residing in Port Arthur, in the county of Jefferson and State of Texas, have invented certain new and useful Improvements in Joining Materials, of which the following is a specification.

This invention relates to the preparation of compositions for lining and for joining and binding together the brick work in the refractory furnaces and retorts. More particularly it pertains to the preparation of joining and lining composition capable of withstanding the action of chemical gases and vapors at high temperatures.

Among the objects of my invention may be mentioned the preparation of materials of this nature that have good fluxing and binding qualities, the preparation of compositions adapted to resist the action of such gases as chlorin at various temperatures particularly at the extremely high temperatures at which chlorin is commonly used in chemical reactions, the production of joining materials that are not affected by sudden changes in temperature and which will not crack or shell off when subjected to temperature fluctuations, and the making of joining compositions that will not only resist the action of gases at high temperatures but will also be impervious to moisture at low temperatures.

In the practice of my invention I use two or more substances, having relatively high melting points, one of the substances having a lower melting point than the others so that it is capable upon the application of sufficient heat of fluxing with the higher melting point materials and forming a permanent binder for the composition. In the preparation of such a composition it is necessary to provide a temporary binder to hold the materials together until the high heat necessary to flux the high melting point materials can be applied. For this purpose I employ a material capable of being vaporized at a temperature below the fluxing temperature of the permanent binder.

In order to fully disclose my invention those skilled in the art I will now describe in detail a particular example thereof, using as types of the high melting point materials, flint glass and fire brick and describing in detail a preferred method of preparing the composition.

The flint glass ground to approximately 100 mesh and the fire brick pulverized to approximately 60 mesh are thoroughly mixed together in a dry state and placed in an acid proof kettle to which a portion of hydrochloric acid is added. The mixture is allowed to stand from 24 to 75 hours in order that the acid may take up any organic matters that may be present. Pure water is then added and the mixture is agitated with air or steam, the latter being preferred, and a temperature of about 212° F. being maintained during the mixing.

From time to time the water is drawn off and fresh water is added. When the acid and organic matters have been removed the mixture is placed on a separator sagger in order to thoroughly drain off all the water. The temporary binder, which is preferably dextrine but may be some such material as ordinary wash soap, molasses, or brown sugar, is then added to the mixture forming a plastic mass. This plastic material is then placed in the lining of a retort or furnace or used as a joining material in the brick work of such furnace or retort. Upon being allowed to set the composition becomes solid and very hard. Heat is then applied which causes the temporary or vaporizable binder to pass off in the form of vapor leaving only traces of residue or carbon behind. For the materials which I commonly use as a temporary binder this vaporization occurs at a furnace temperature of approximately 500° F. The heating is then continued until the flint glass melts and fluxes with the fire brick to form a stable composition.

In order to more fully describe my invention, I will now detail a number of examples thereof showing the proportions by weight of various ingredients which I have found to be suitable for various purposes. It is understood that the preparation of these compositions may be carried on substantially as has been described in the example already given. In each case the melting point of the composition is stated in order to give an idea of the character of the product, it being understood that whenever particular temperatures are stated in this specification that the temperatures so stated are more or less approximate and that they are furnace temperatures, that is, the temperatures in the furnaces in the construction of which the compositions were used.

Number 1.

Flint glass approximately 100 mesh 12%.
Fire brick approximately 60 mesh 88%.
Melting point over 2800° F.

Number 2.

Flint glass approximately 100 mesh 10%.
White lead 10%.
Fire brick approximately 60 mesh 80%.
Melting point about 2725° F.

Number 3.

Feldspar approximately 100 mesh 10%.
White lead 12%.
Fire brick approximately 60 mesh 78%.
Melting point about 2550° F.

Number 4.

Feldspart approximately 100 mesh 48%.
Fire brick approximately 60 mesh 52%.
Melting point about 2250° F.

Number 5.

Flint glass approximately 100 mesh 50%.
Fire brick approximately 60 mesh 50%.
Melting point about 1800° F.

Number 6.

Feldspar approximately 100 mesh 30%.
Fire brick approximately 60 mesh 30%.
Borax approximately 100 mesh 10%.
Pure silica approximately 100 mesh 30%.
Melting point about 2400° F.

Number 7.

Flint glass approximately 100 mesh 40%.
Pure flint silica approximately 100 mesh 60%.
Melting point about 2000° F.

Number 8.

Pure flint silica, approximately 100 mesh 60%.
Feldspar approximately 100 mesh 40%.
Melting point about 2475° F.

Number 9.

Flint glass approximately 100 mesh 30%.
Feldspar approximately 100 mesh 30%.
Fire brick approximately 60 mesh 40%.
Melting point about 1650° F.

Number 10.

Flint glass approximately 100 mesh 18%.
Flint approximately 100 mesh 16%.
Feldspar approximately 100 mesh 10%.
White sand approximately 60 mesh 56%.
Melting point about 2325° F.

It is understood that the proportions of ingredients used in the practice of my invention will vary with the purposes in view and that departure may be made from the particular proportions given in the above instances of the invention, the examples being given to show proportions which I have found advantageous for various purposes, and that the practice of my invention is not limited to any particular proportions of materials except as limited in the claims.

Ordinarily in choosing a composition for a given use the melting point should be considered so that the compound chosen will have a melting point above the temperature to which it will be subjected. For example composition Number 1 may be used at very high temperatures; it has been tested out in chlorinating retorts and has been found to resist the action of chlorin at temperatures around 2800° F., at which temperature the composition did not melt nor permit any chlorin gas to escape. Composition Number 5, for example is not adapted for use at that temperature for the exterior joints or for furnace linings but at temperatures under 1800° F. it forms an excellent material for such purposes. Any of the compositions may, however, be used at temperatures below their melting points for wall joints (the interior spaces between refractory walls), since the molten mass seals all pores and cracks. Composition 2 is similar to Number 1 but has lower fusing and melting points. Number 3 forms a good material for wall joints in refractory furnaces at temperatures under 2550° F. Composition 7 when properly burned is noted for its light grey colored glaze, the inside being in a vitric state and having a porcelain cast.

The compositions forming the subject matter of my invention are well suited for other uses besides that of forming linings and joining materials for furnaces and retorts; they may be used in casting special furnace walls and parts which may be molded and burned in standard brick kilns, such as crucibles, cupola blocks, rotary kiln blocks, gas flue blocks, electrical furnace, gas generator blocks, recuperator tile gas producer blocks, carbon dioxide gas retorts and aluminum chlorid retorts and parts. For most of these uses Number 1 is preferred as it will best stand the high temperatures generally employed in such uses.

What I claim is:

1. A joining material comprising flint glass and pulverized fire brick.

2. A joining material comprising flint glass and pulverized fire brick and a temporary vaporizable binder.

3. A joining material adapted for high temperatures comprising flint glass in a finely divided form and a dextrinous binder mixed with water into a plastic mass for use as a mortar or cement and allowed to set in place, the joining material being completed in its final form by applying high temperature heat to drive off the binder and flux the flint glass.

In witness whereof I have hereunto set my hand and seal this 31st day of January 1920.

GEORGE D. WHITE.